United States Patent
Murtha, Jr. et al.

(10) Patent No.: US 10,359,023 B2
(45) Date of Patent: Jul. 23, 2019

(54) ARTICULATING WAVE ENERGY CONVERSION SYSTEM USING A COMPOUND LEVER-ARM BARGE

(71) Applicant: Murtech, Inc., Glen Burnie, MD (US)

(72) Inventors: Robert C. Murtha, Jr., Stevensville, MD (US); Michael E. McCormick, Annapolis, MD (US)

(73) Assignee: MURTECH, INC., Glen Burnie, MD (US)

( * ) Notice: Subject to any disclaimer, the term of this patent is extended or adjusted under 35 U.S.C. 154(b) by 0 days.

(21) Appl. No.: 15/871,577

(22) Filed: Jan. 15, 2018

(65) Prior Publication Data

US 2018/0202413 A1  Jul. 19, 2018

Related U.S. Application Data

(60) Provisional application No. 62/447,490, filed on Jan. 18, 2017.

(51) Int. Cl.
*F03B 13/20* (2006.01)
*F03G 7/08* (2006.01)

(52) U.S. Cl.
CPC .............. *F03B 13/20* (2013.01); *F03G 7/08* (2013.01); *F05B 2250/411* (2013.01);
(Continued)

(58) Field of Classification Search
USPC ....................................... 290/42, 53; 60/500
See application file for complete search history.

(56) References Cited

U.S. PATENT DOCUMENTS

| | | |
|---|---|---|
| 71,287 A | 11/1867 | Dennison et al. |
| 260,016 A | 6/1882 | Franklin |

(Continued)

FOREIGN PATENT DOCUMENTS

| | | |
|---|---|---|
| CA | 1193490 | 9/1985 |
| CN | 201620995 | 11/2010 |

(Continued)

OTHER PUBLICATIONS

Bernitsas, et al., "VIVACE (Vortex Induced Vibration for Aquatic Clean Energy): A New Concept in Generation of Clean and Renewable Energy from Fluid Flow," Proceedings of OMAE2006, Paper OMAE06-92645, Hamburg, Germany Jun. 4-9, 2006, pp. 1-18.
(Continued)

*Primary Examiner* — Pedro J Cuevas
(74) *Attorney, Agent, or Firm* — Caesar Rivise, PC

(57) ABSTRACT

An articulating wave energy conversion system (AWECS) formed of a forward barge hingedly-coupled to a two-part aft barge configuration for reducing the attenuation of available wave energy along the length of the AWECS. The two-part aft barge includes a buoyant section that is either rigidly-connected, or unitized with, a lever-arm barge. The lever-arm barge includes a draft that is much smaller than the drafts of the forward barge and buoyant section. In addition, the lever-arm barge includes a large waterplane area that results in large hydrostatic forces as the waves pass. One or more intermediate barges may be hingedly-coupled between the forward barge and the aft barge. Pumps can be positioned across every hinge to convert the barge articulations into mechanical energy for driving the pumps based on wave motion for a variety of functions, such as water desalination, electrical energy generation, etc.

14 Claims, 4 Drawing Sheets

(52) U.S. Cl.
CPC ..... *F05B 2250/73* (2013.01); *F05B 2260/406* (2013.01); *Y02A 20/144* (2018.01); *Y02E 10/38* (2013.01)

(56) References Cited

U.S. PATENT DOCUMENTS

| | | | |
|---|---|---|---|
| 344,813 A | 7/1886 | Bull | |
| 882,883 A * | 3/1908 | Hillson | F03B 13/20 60/500 |
| 917,411 A * | 4/1909 | Cassella | F03B 13/20 60/500 |
| 1,078,323 A | 11/1913 | Trull | |
| 1,636,447 A | 7/1927 | Standish | |
| 2,731,799 A | 1/1956 | Lange et al. | |
| 3,022,632 A | 2/1962 | Parks | |
| 3,191,202 A | 6/1965 | Handler | |
| 3,376,588 A | 4/1968 | Berteaux | |
| 3,628,334 A | 12/1971 | Coleman | |
| 3,755,836 A | 9/1973 | Milazzo | |
| 3,818,523 A | 6/1974 | Stillman, Jr. | |
| 3,846,990 A | 11/1974 | Bowley | |
| 3,848,419 A | 11/1974 | Bowley | |
| 4,004,308 A | 1/1977 | Gongwer | |
| 4,048,802 A | 9/1977 | Bowley | |
| 4,077,213 A * | 3/1978 | Hagen | F03B 13/20 417/331 |
| 4,098,084 A | 7/1978 | Cockerell | |
| 4,118,932 A | 10/1978 | Sivill | |
| 4,209,283 A | 6/1980 | Marbury | |
| 4,210,821 A | 7/1980 | Cockrell | |
| 4,255,066 A | 3/1981 | Mehlum | |
| 4,264,233 A | 4/1981 | McCambridge | |
| 4,280,238 A | 7/1981 | van Heijst | |
| 4,326,840 A | 4/1982 | Hicks et al. | |
| 4,335,576 A | 6/1982 | Hopfe | |
| RE31,111 E * | 12/1982 | Hagen | F03B 13/20 417/331 |
| 4,408,454 A * | 10/1983 | Hagen | F03B 13/1815 417/331 |
| 4,421,461 A | 12/1983 | Hicks et al. | |
| 4,512,886 A | 4/1985 | Hicks et al. | |
| 4,684,815 A * | 8/1987 | Gargos | F03B 13/20 290/42 |
| 4,686,377 A | 8/1987 | Gargos | |
| 4,698,969 A | 10/1987 | Raichlen et al. | |
| 4,781,023 A * | 11/1988 | Gordon | F03B 13/20 290/42 |
| 4,894,873 A | 1/1990 | Kiefer et al. | |
| 4,954,110 A | 9/1990 | Warnan | |
| 5,112,483 A | 5/1992 | Cluff | |
| 5,132,550 A | 7/1992 | McCabe | |
| 5,186,822 A | 2/1993 | Tzong et al. | |
| 5,359,229 A | 10/1994 | Youngblood | |
| 5,558,459 A | 9/1996 | Odenbach et al. | |
| 5,584,673 A | 12/1996 | Rein | |
| 5,600,961 A | 2/1997 | Whipple, III | |
| 5,879,105 A | 3/1999 | Bishop et al. | |
| 6,406,221 B1 | 6/2002 | Collier | |
| 6,451,204 B1 | 9/2002 | Anderson | |
| 6,476,511 B1 | 11/2002 | Yemm et al. | |
| 6,647,716 B2 | 11/2003 | Boyd | |
| 6,863,806 B2 | 3/2005 | Stark et al. | |
| 7,023,104 B2 | 4/2006 | Kobashikawa | |
| 7,042,112 B2 | 5/2006 | Wood | |
| 7,245,041 B1 | 7/2007 | Olson | |
| 7,264,420 B2 | 9/2007 | Chang | |
| 7,443,047 B2 | 10/2008 | Ottersen | |
| 7,579,704 B2 | 8/2009 | Steenstrup et al. | |
| 7,658,843 B2 | 2/2010 | Krock et al. | |
| 7,694,513 B2 | 4/2010 | Steenstrup et al. | |
| 7,728,453 B2 | 6/2010 | Evans | |
| 7,900,571 B2 | 3/2011 | Jaber et al. | |
| 8,193,651 B2 * | 6/2012 | Lightfoot | F03B 13/20 290/42 |
| 8,304,925 B2 * | 11/2012 | Yang | F03B 13/20 290/42 |
| 8,358,025 B2 * | 1/2013 | Hogmoe | F03B 13/1815 290/53 |
| 8,564,151 B1 | 10/2013 | Huenber | |
| 8,650,869 B1 | 2/2014 | McCormick | |
| 8,778,176 B2 * | 7/2014 | Murtha | B01D 24/14 210/170.11 |
| 8,784,653 B2 * | 7/2014 | Murtha | B01D 24/042 210/170.11 |
| 8,866,321 B2 * | 10/2014 | McCormick | F03B 13/20 290/42 |
| 9,115,689 B2 * | 8/2015 | Malligere | F03B 13/22 |
| 9,334,860 B2 | 5/2016 | Knowles, Jr. et al. | |
| 9,435,317 B2 | 9/2016 | Cunningham et al. | |
| 9,702,334 B2 * | 7/2017 | Murtha, Jr. | F03B 13/20 |
| 10,029,927 B2 * | 7/2018 | Murtha | B01D 24/042 |
| 10,030,645 B2 * | 7/2018 | Knowles | F04B 5/02 |
| 2003/0010691 A1 | 1/2003 | Broussard | |
| 2003/0121408 A1 | 7/2003 | Linerode et al. | |
| 2006/0112871 A1 | 6/2006 | Dyhrberg | |
| 2006/0283802 A1 | 12/2006 | Gordon | |
| 2007/0108112 A1 | 5/2007 | Jones et al. | |
| 2007/0200353 A1 | 8/2007 | Ottersen | |
| 2009/0084296 A1 | 4/2009 | McCormick | |
| 2010/0054961 A1 | 3/2010 | Palecek et al. | |
| 2010/0320759 A1 | 12/2010 | Lightfoot et al. | |
| 2011/0089689 A1 | 4/2011 | Gregory | |
| 2011/0121572 A1 | 5/2011 | Levchets et al. | |
| 2011/0299927 A1 | 12/2011 | McCormick et al. | |
| 2011/0304144 A1 | 12/2011 | Dehlsen et al. | |
| 2012/0025532 A1 | 2/2012 | Song | |
| 2012/0067820 A1 | 3/2012 | Henthorne et al. | |
| 2013/0008158 A1 | 1/2013 | Hon | |
| 2013/0008164 A1 | 1/2013 | Cunningham et al. | |
| 2014/0008306 A1 * | 1/2014 | Murtha | B01D 24/042 210/747.5 |
| 2014/0091575 A1 * | 4/2014 | McCormick | F03B 13/20 290/53 |
| 2014/0158624 A1 * | 6/2014 | Murtha | B01D 24/14 210/652 |
| 2016/0236950 A1 * | 8/2016 | Murtha | B01D 24/14 |
| 2016/0273513 A1 * | 9/2016 | Murtha, Jr. | F03B 13/20 |
| 2017/0129788 A1 * | 5/2017 | Murtha, Jr. | C02F 1/441 |
| 2018/0010570 A1 * | 1/2018 | Murtha, Jr. | F03B 13/20 |

FOREIGN PATENT DOCUMENTS

| | | |
|---|---|---|
| DE | 2248260 | 4/1974 |
| FR | 2437507 | 4/1980 |
| GB | 2113311 | 8/1983 |
| GB | 2459112 | 10/2009 |
| JP | 2002142498 | 5/2002 |
| KR | 20110020077 | 3/2011 |
| WO | WO 95/10706 | 4/1995 |
| WO | WO 01/96738 | 12/2001 |
| WO | WO 03/026954 | 4/2003 |
| WO | WO 2013/115581 | 8/2013 |

OTHER PUBLICATIONS

Blevins, Robert D., "Flow-Induced Vibrations," Van Nostrand Reinhold, New York, 1990, pp. 194-213.

Budar, et al., "A Resonant Point Absorber of Ocean-Wave Power," Nature, vol. 256, Aug. 1975, pp. 478-480.

Cébron, et al., "Vortex-Induced Vibrations Using Wake Oscillator Model Comparison on 2D Response with Experiments," Institute of Thermomechanics, Prague, 2008.

Falnes, Johannes, "Ocean Waves Oscillating Systems," Cambridge University Press, pp. 196-224, 2002.

Farshidianfar, et al., "The Lock-in Phenomenon in VIV Using a Modified Wake Oscillator Model for Both High and Low Mass-Damping Ratio," Iranian Journal of Mechanical Engineering, vol. 10, No. 2, Sep. 2009.

Garnaud, et al, "Comparison of Wave Power Extraction by a Compact Array of Small Buoys and by a Large Buoy," Proceedings

(56) References Cited

OTHER PUBLICATIONS of the 8th European Wave and Tidal Energy Conference, Uppsala, Sweden, 2009, pp. 934-942.
Jauvitis, et al., The Effect of Two Degrees of Freedom on Vortex-Induced Vibration at Low Mass and Damping,: J. Fluid Mechanics, vol. 509, 2004, pp. 23-62.
Lee, et al., "On the Floating Breakwater—A New Arrangement," Proceedings, International Conf. on Coastal Engineering, Taipei, 1986, pp. 2017-2022.
Leong, et al., "Two-Degree-of-Freedom Vortex-Induced Vibration of a Pivoted Cylinder Below Critical Mass Ratio," Proceedings of the Royal Society A, vol. 464, 2008, pp. 2907-2927.
Liang, et al., "A Study of Spar Buoy Floating Breakwater," Ocean Engineering, vol. 31, 2004, pp. 43-60.
McCormick, et al., "Full-Scale Experimental Study of Bi-Modal Buoy," Report EW 01-11, Department of Naval Architecture and Ocean Engineering, U.S. Naval Academy, Jun. 2011, 32 pages.
McCormick, et al., "Planing Characteristics of Fast-Water Buoys," Journal of the Waterways Harbors and Coastal and Engineering Division, vol. 99, No. WW4, Nov. 1973, pp. 485-493.
McCormick, et al., "Prototype Study of a Passive Wave-Energy Attenuating Bi-Modal Buoy," Murtech, Inc. Report M-12-1, Jan. 2012, 26 pages.
Miles, John W., "On the Interference Factors for Finned Bodies," J. Aeronautical Sciences, vol. 19, No. 4, Apr. 1952, p. 287.
Murali, et al., "Performance of Cage Floating Breakwater," Journal of Waterway, Port, Costal and Ocean Engineering, Jul./Aug. 1997, pp. 1-8.
Ng, et al., "An Examination of Wake Oscillator Models for Vortex-Induced Vibrations," Naval Undersea Warfare Center Division, Newport, RI, Technical Report 11,298, Aug. 1, 2011, 18 pages.
Ogink, et al., "A Wake Oscillator With Frequency Dependent Coupling for the Modeling of Vortex-Induced Vibration," Journal of Sound and Vibration, No. 329, 2010, pp. 5452-5473.
Rodenbusch, George, "Response of a Pendulum Spar to 2-Dimensional Random Waves and a Uniform Current," Massachusetts Institute of Technology and Woods Hole Oceanographic Institution, Engineering Program, Ph.D. Dissertation, Aug. 1978, 138 pages.
Ryan, et. al., "Energy Transfer in a Vortex Induced Vibrating Tethered Cylinder System", Conf. on Bluff Body Wakes and Vortex-Induced Vibrations, Port Douglas, Australia, Dec. 2002, 4 pages.
Shiguemoto, et al., "Vortex Induced Motions of Subsurface Buoy with a Vertical Riser: A Comparison Between Two Phenomenological Models" Proceedings, 23° Congresso Nacional de Transporte Aquaviário, Construção Naval e Offshore, Rio de Janeiro, Oct. 25-29, 2010, pp. 1-9.
Sobey, et al., "Hydrodynamic of Circular Piles," Proceedings, 6th Australian Hydraulics and Fluid Mechanics Conference, Adelaide, Dec. 1977, pp. 253-256.
Long Beach Water Department, Under-Ocean Floor Seawater intake and Discharge Test Plan, Apr. 1, 2009.
Lovo, Robert, "Initial Evaluation of the Subfloor Water Intake Structure System (SWISS) vs. Conventional Multimedia Pretreatment Techniques," Assistance Agreement No. 98-FC-81/0044, Desalination Research and Development Program Report No. 66, U.S. Dept. of Interior, May 2001.
McCormick, "Ocean Wave Energy Conversion," Wiley-Interscience, New York (1981, reprinted by Dover Publication, Long Island, New York in 2007).
WateReuse Association, "Overview of Desalination Plan Intake Alternatives", Mar. 2011.
International Search Report for related PCT Application No. PCT/US2013/059175 dated Mar. 19, 2014.
International Search Report for related PCT Application No. PCT/US2013/048906 dated Sep. 30, 2013.
International Search Report for corresponding PCT Application No. PCT/US2014/056243 dated Dec. 15, 2014.
International Seach Report for corresponding PCT Application No. PCT/US2016/022438 dated Jun. 21, 2016.
International Search Report for related PCT Application No. PCT/US2018/013703 dated Apr. 27, 2018.
English Abstract of WO 2013/115581.

* cited by examiner

ARTICULATING WAVE ENERGY CONVERSION SYSTEM USING A COMPOUND LEVER-ARM BARGE

CROSS-REFERENCE TO RELATED APPLICATIONS

This non-provisional application claims the benefit under 35 U.S.C. § 119(e) of Application Ser. No. 62/447,490 filed on Jan. 18, 2017 entitled ARTICULATING WAVE ENERGY CONVERSION SYSTEM USING A COMPOUND LEVER-ARM BARGE, and whose entire disclosure is incorporated by reference herein.

BACKGROUND OF THE INVENTION

The present invention relates in general to wave energy conversion systems and, more particularly, to an articulating wave energy conversion system that minimizes incident wave energy attenuation using a compound lever-arm barge.

Richard Peter McCabe devised the McCabe Wave Pump, which is described in U.S. Pat. No. 5,132,550. The McCabe Wave Pump consists of three rectangular steel pontoons, which move relative to each other in the waves. A damper wave plate attached to the central pontoon ensures that it remains stationary as the fore and aft pontoons move relative to the central pontoon by pitching about the hinges. Energy is extracted from the rotation about the hinge points by linear hydraulic pumps mounted between the central and other two pontoons near the hinges.

A related configuration to the McCabe Wave Pump is an "articulating wave energy conversion system (AWECS)" which is disclosed in U.S. Pat. No. 8,778,176 (Murtha, et al.); U.S. Pat. No. 8,784,653 (Murtha, et al.); and U.S. Pat. No. 8,866,321 (McCormick, et al.), and all of which are owned by the same Assignee as the present application, namely, Murtech, Inc. of Glen Burnie, Md. See also U.S. Pat. No. 8,650,869 (McCormick). As shown in FIG. 1, an AWECS 1 uses a plurality of pneumatic or hydraulic pumps P (hereinafter, "hydraulic" is used, it being understood that "pneumatic" is also interchangeable with "hydraulic") that straddle the two articulating barges, a forward barge 2 and a rear (also referred to as "aft") barge 4 which are coupled together, e.g. by hinges to a central barge 3. Although not shown, a damper wave plate may be attached to the central barge 3 and submerged in the water which ensures that it remains stationary as the fore 2 and aft 4 barges move relative to the central barge 3 by pitching about the hinges. As an incoming wave makes contact with the forward barge 2 first, the hydraulic fluid in the pumps P coupled between the forward barge 2 and the center barge 3 are driven in a first direction; as the wave continues, the hydraulic fluid in the pumps P coupled between the rear barge 4 and the center barge 3 are driven in a second opposite direction. The end results are bi-directional hydraulic pumps P. The high pressure fluid output of these hydraulic pumps P may be used for a variety of functions such as, but not limited to, water desalination, irrigation of salt water vegetation or various energy conversions.

However, in the wave-energy conversion process, the design orientation of the system with the incident waves is such that the bow line is assumed to be parallel with the incident wave crest. As the waves pass the system, the barges 2/4 are excited, mainly in angular pitching motions. If pumps are connected to the barges, and placed over or under the hinges in FIG. 1, the pumps are excited by the barge motions. This is called the "power takeoff", or PTO, mechanism. As the waves travel along the floating system, the available energy in the neighborhood of the barge is reduced because of the absorption of the forward barge (or barges). The absorbed energy is somewhat replaced by the process called wave diffraction, where wave energy travels along the crest from a high-energy local to a low-energy local—the latter being the neighborhood of the articulated barge.

As can be appreciated from the foregoing, the attenuation of the available wave energy along the length of the articulated-barge system length poses a problem. That is, less energy is available to the after barge or barges.

Thus, there remains a need for an articulated wave energy conversion system that can minimize the attenuation of available wave energy along the length of the articulated-barge system length so that the energy of the incident waves can be converted into significant mechanical energy (e.g., large pump pressures) for use in such things as potable water production, electrical energy generation, etc.

All references cited herein are incorporated herein by reference in their entireties.

BRIEF SUMMARY OF THE INVENTION

A system for converting wave energy from a body of water having waves (e.g., ocean, sea, fresh water, etc.) into usable mechanical energy is disclosed. The system comprises: an articulated barge system for floating on the body of water having waves and wherein the barge system comprises: a first barge that is pivotally-coupled (e.g., a hinge) to a second barge having two portions, wherein the first portion has a draft that is similar to a draft of the first barge, and wherein the second portion comprises a lever barge having a large waterplane that forms a draft that is smaller than the draft of the first portion when the first and second barges are positioned in the body of water; and at least one pump (e.g., a bi-directional pump, etc.) positioned across the pivotal coupling that converts wave energy into pump motion when the first and second barges articulate; and wherein the lever-arm barge reduces attenuation of available wave energy along a length of the second barge.

A method for converting wave energy from a body of water having waves (e.g., ocean, sea, fresh water, etc.) into usable mechanical energy is disclosed. The method comprises: forming a first barge having a two portion configuration, wherein the first portion comprises a buoyant element having a first draft when positioned in the body of water and the second portion comprising a lever arm barge having a large waterplane that forms a second draft when positioned in the body of water, and wherein the second draft is less than the first draft; pivotally-coupling (e.g., a hinge) the first portion to a second barge which also comprises the first draft when the second barge is positioned in the body of water; positioning at least one pump (e.g., a bi-directional pump, etc.) across the pivotal coupling for converting wave energy into pump motion; orienting the first and second barges such that the second barge encounters wave motion first; and permitting the first barge and the second barge to articulate when exposed to the wave motion and wherein the lever-arm barge reduces attenuation of available wave energy along a length of the first barge.

BRIEF DESCRIPTION OF SEVERAL VIEWS OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE PREFERRED EMBODIMENTS

Figure 1:
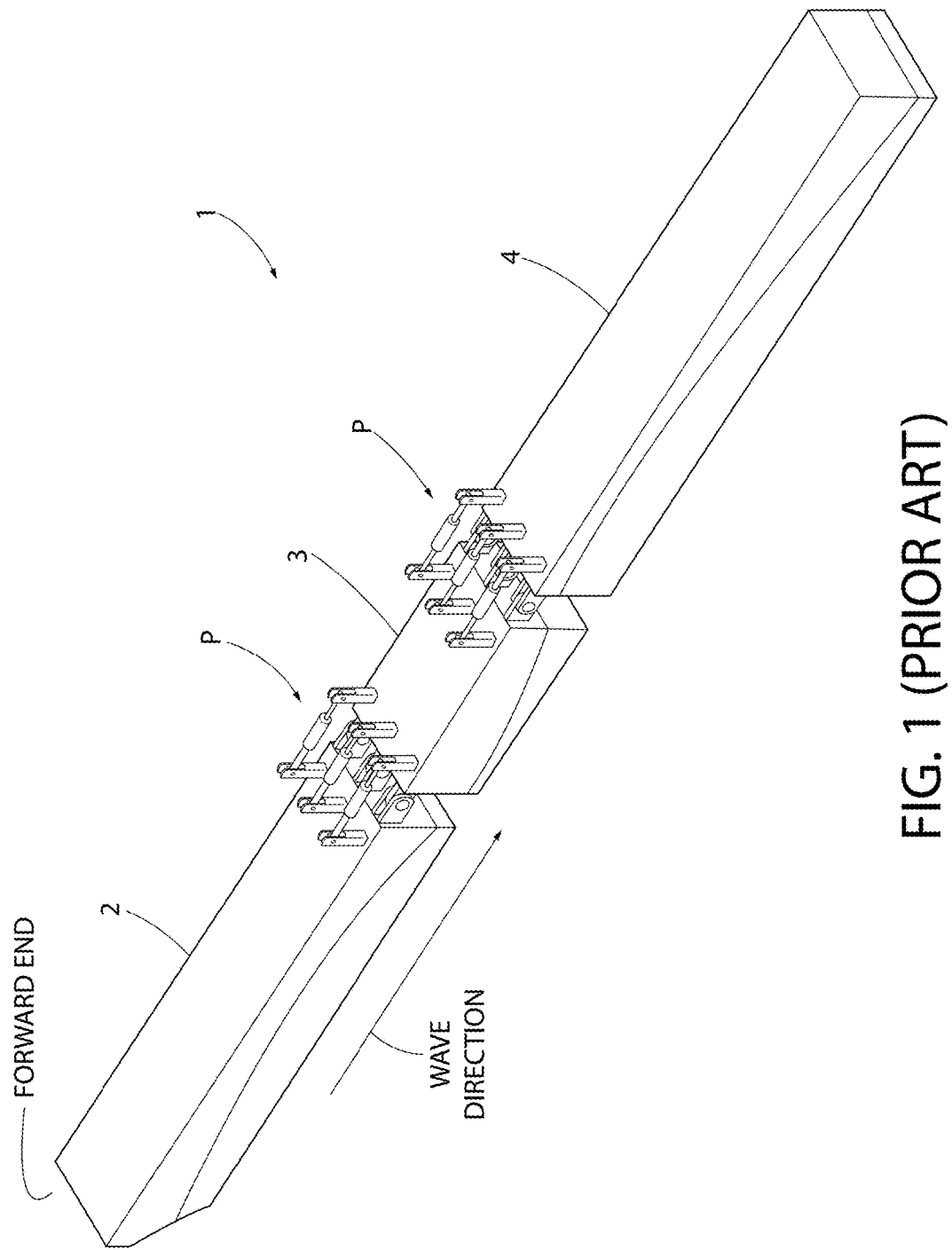
FIG. 1 is an isometric view of a prior art articulating barge wave-energy conversion system (AWECS)

Referring now to the figures, wherein like reference numerals represent like parts throughout the several views, exemplary embodiments of the present disclosure will be described in detail. Throughout this description, various components may be identified having specific values, these values are provided as exemplary embodiments and should not be limiting of various concepts of the present invention as many comparable sizes and/or values may be implemented.

Figure 2:
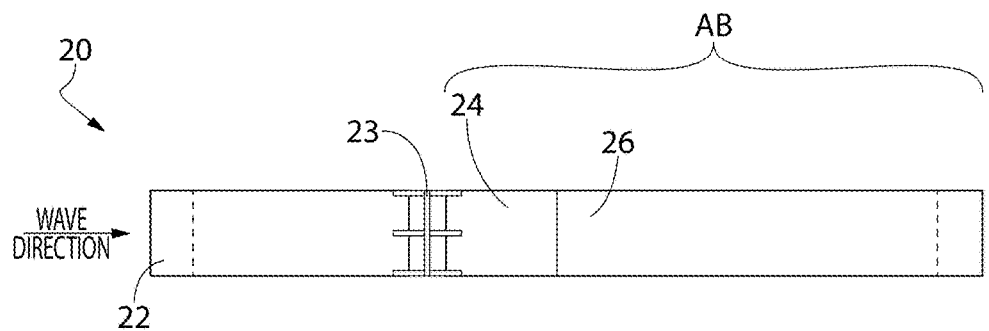
FIG. 2 is a top view of the articulating wave energy conversion system (AWECS) using a compound lever-arm barge of the present invention.
Figure 2A:
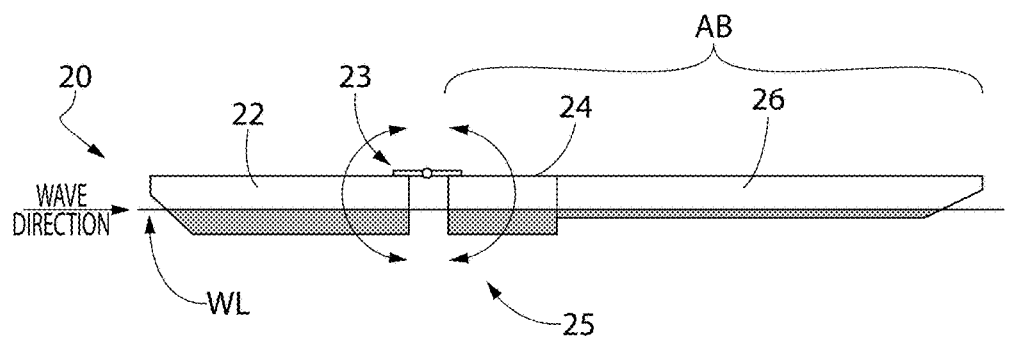
FIG. 2A is a side view of the AWECS using the compound lever-arm barge of the present invention shown in its equilibrium condition.
Figure 2B:
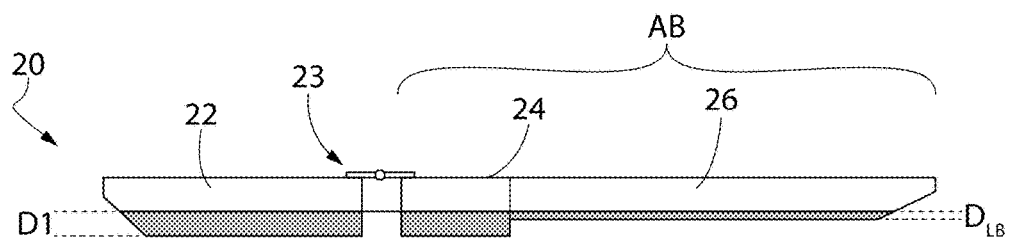
FIG. 2B is a side of the AWECS of FIG. 2A but showing the difference in drafts of the various barges and the lever-arm barge.

The present invention 20 comprises a two-part configuration, as shown most clearly in FIGS. 2-2B. In particular, the modified AWECS 20 comprises a front barge 22 that is coupled by a hinge 23 to an aft barge AB that comprises a buoyant portion 24 which is contiguous with a longer thin barge portion, also referred to as a "lever-arm barge" 26. When the modified AWECS 20 is positioned for operation, the incident waves are such that the bow line of the front barge 22 is assumed to be parallel with incident wave crest. The buoyant chamber 24 assists in maintaining the level positions of the decks of the aft barge AB in a still-condition. The buoyant portion 24 may be a separate component that is rigidly-coupled to the lever-arm barge 26; or, the buoyant portion 24 and the lever-arm barge 26 may be a unitized component. Either way, during operation, the lever-arm barge 26 is "down-wave" from the buoyant portion 24.

Figure 5:
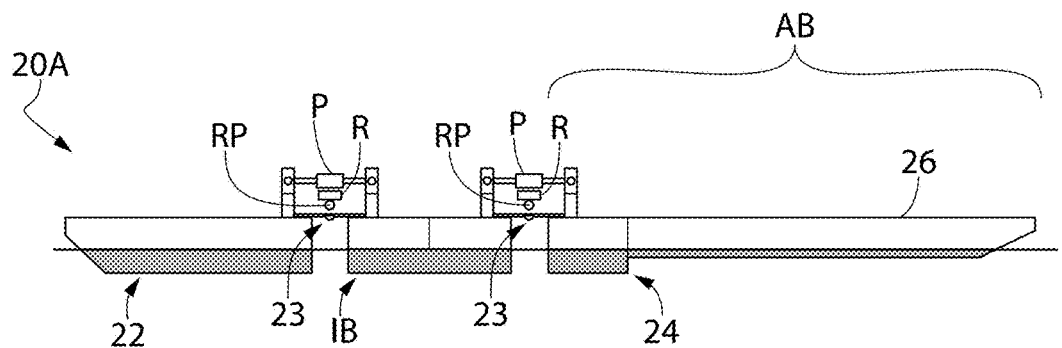
FIG. 5 is a side view of the AWECS using the compound lever-arm barge of the present invention and one intermediate barge and also using including pumps positioned across the hinges, as well as a flow rectifier and a rotary vane pump, by way of example only.
Figure 5A:
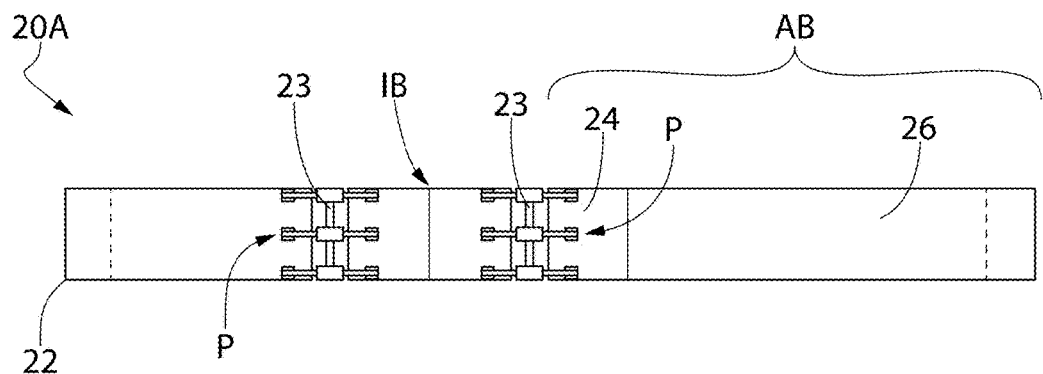
FIG. 5A is a top view of the AWECS using the compound lever arm and at least one intermediate barge along with a plurality of pumps of FIG. 5.

As the waves pass the modified AWECS 20, the front barge 22 and aft barge AB are excited, mainly in angular motions, as indicated by the arrows 25. If pumps P (FIGS. 5-5A) are connected to the front barge 22 and the after barge AB, (e.g., placed over or under the hinge(s) 23, as shown in FIGS. 5-5A) by way of example only, the pumps P are excited by the barge motions. This is called the "power takeoff", or "PTO mechanism." As can be seen most clearly in FIG. 2B, the lever-arm barge 26 has a smaller draft, $D_{LB}$, than the forward barge draft, D1. Furthermore, the lever-arm barge 26 has a large waterplane area (viz., length×breadth at the waterline WL). This large waterplane results in large hydrostatic forces as the waves pass. Because of the relatively shallow draft (viz., $D_{LB}$), the weight of the barge per unit length is small. For a given wave having a period T and height H, the net wave force on a floating body increases as the draft decreases. This is due to the dynamics of water waves which exponentially increase as the depth decreases; hence, the shallower draft results in a higher net wave force. As a result, the modified AWECS 20 of the present invention is able to convert the energy of incident waves into large pump pressures for use in a variety of processes, e.g., potable water production, pumping, etc.

For example, salt water can be drawn in from the surrounding sea water (or fresh water, if the modified AWECS 20 is positioned in a fresh water environment, etc.) and pre-filtered (associated filters not shown). This pressurized pre-filtered water can then be fed through a flow rectifier R (FIG. 5), if bi-directional pumps P are used, for providing a unidirectional pressurized water flow to an onboard desalination system (not shown) which includes reverse osmosis membranes and from which potatable water is generated. Alternatively, this unidirectional pressurized pre-filtered salt water may be used to irrigate salt water crops. Where electrical energy generation is implemented with the modified AWECS 20, a rotary-vane pump RP may also be included for driving an electrical generator.

Figure 3:
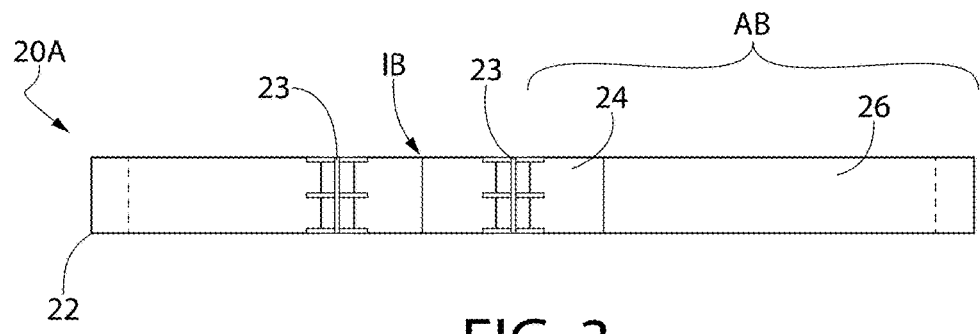
FIG. 3 is a top view of the AWECS using the compound lever-arm barge of the present invention but using an intermediate barge therein.
Figure 3A:
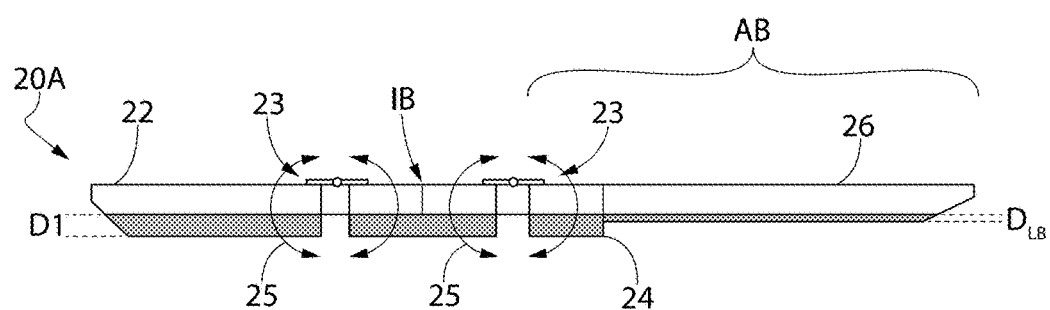
FIG. 3A is a side view of the AWECS using the compound lever-arm barge of the present invention using an intermediate barge and shown in its equilibrium condition.
Figure 4:
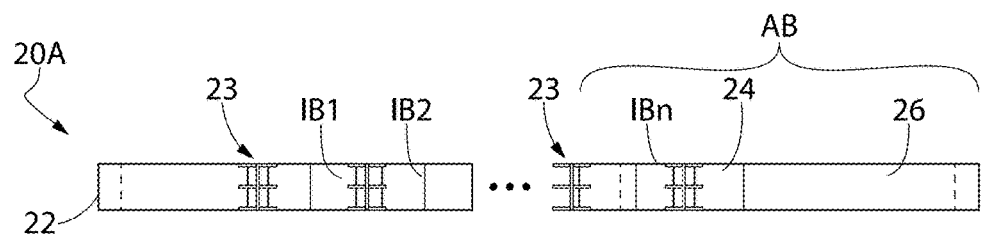
FIG. 4 is a top view of the AWECS using the compound lever-arm barge of the present invention but using a plurality of intermediate barges therein.
Figure 4A:
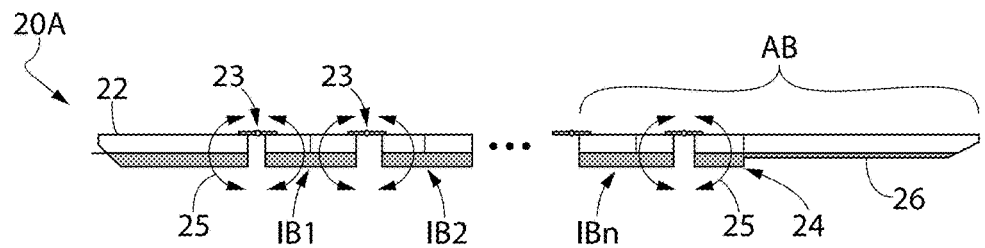
FIG. 4A is a side view of the AWECS using the compound lever-arm barge of the present invention but using a plurality of intermediate barges therein and shown in its equilibrium condition.

It should be understood that FIGS. 2-2B provide the broadest version of the modified AWECS 20. However, as shown in FIGS. 3-3A the modified AWECS 20A may include an intermediate barge D3 between the forward barge 22 and the aft barge AB. In particular, an intermediate barge D3 is shown hingedly coupled to the front barge 22 and to the after barge AB via hinges 23. The intermediate barge D3 has a draft D1 similar to the draft of the forward barge 22. Furthermore, it is within the broadest scope of the present invention whereby a plurality of intermediate barges IB1, IB2, . . . IBn are included in the modified AWECS 20A, as shown in FIGS. 4-4A. The only requirement is that the aft barge AB, comprising the buoyant portion 24 and the lever-arm barge 26, form the last "barge" in the modified AWECS 20A, i.e., being coupled to the last intermediate barge, IBn, as shown in FIGS. 4-4A.

As mentioned previously with respect to the first embodiment 20 of the modified AWECS, pumps, or pump sets, P may be positioned across every hinge 23, whether between the forward barge 22 and the adjacent intermediate barge IB, or between every adjacent intermediate barge IB, or between the forward barge 22 and the aft barge AB, if no intermediate barges D3 are used, etc., as shown in FIGS. 5 and 5A, for generating a pressurized water flow. Flow rectifiers R can also be included to generate a unidirectional pressurized water flow if the pump (or pump sets) P are bi-directional pumps. Rotary vane pumps RP can also be associated with the pumps for generating electrical energy.

Alternatively, the pump or pump sets P may comprise a closed system whereby the pump medium may be hydraulic fluid, rather than water from the surrounding water environment. In that scenario, the barge articulation generates a pressurized hydraulic fluid.

While the invention has been described in detail and with reference to specific examples thereof, it will be apparent to one skilled in the art that various changes and modifications can be made therein without departing from the spirit and scope thereof.

What is claimed is:

1. A system for converting wave energy from a body of water having waves into usable mechanical energy, said system comprising:
   an articulated barge system for floating on the body of water having waves, said barge system comprising:
   a first barge that is pivotally-coupled to a second barge having two portions, said first portion having a draft that is similar to a draft of said first barge, said second portion comprising a lever-arm barge having a large waterplane that forms a draft that is smaller than the draft of said first portion when said first and second barges are positioned in the body of water; and
   at least one pump positioned across said pivot that converts wave energy into pump motion when said first and second barges articulate; and
   wherein said lever-arm barge reduces attenuation of available wave energy along a length of said second barge.

2. The system of claim 1 further comprising at least one intermediate barge, said at least one intermediate barge being pivotally-coupled to said first barge along a first side of said intermediate barge and being pivotally-coupled to said second barge along a second side, opposite said first side.

3. The system of claim 2 wherein said at least one intermediate barge comprises a draft similar to said draft of said first barge.

4. The system of claim 1 wherein said first portion is rigidly-connected to said lever-arm barge.

5. The system of claim 1 wherein said first portion is unitized with said second portion.

6. The system of claim 1 wherein said pivotal coupling comprises a hinge.

7. The system of claim 2 wherein said pivotal coupling comprises a hinge.

8. A method for converting wave energy from a body of water having waves into usable mechanical energy, said method comprising:
   forming a first barge having a two portion configuration, said first portion comprising a buoyant element having a first draft when positioned in the body of water and said second portion comprising a lever-arm barge having a large waterplane that forms a second draft when positioned in the body of water, said second draft being less than said first draft;
   pivotally-coupling said first portion to a second barge and which also comprises said first draft when said second barge is positioned in the body of water;
   positioning at least one pump across said pivotal coupling for converting wave energy into pump motion;
   orienting said first and second barges such that said second barge encounters wave motion first; and
   permitting said first barge and said second barge to articulate when exposed to said wave motion and
   wherein said lever-arm barge reduces attenuation of available wave energy along a length of said first barge.

9. The method of claim 8 further comprising the step of pivotally-coupling at least one intermediate barge between said first and second barge, said at least one intermediate barge comprising said first draft when positioned on the body of water.

10. The method of claim 9 wherein said step of pivotally-coupling at least one intermediate barge between said first and second barge comprises pivotally coupling said at least one intermediate barge to said first barge along a first side of said at least one intermediate barge and pivotally coupling said at least one intermediate barge to said first portion along a second side of said at least one intermediate barge, said second side being opposite said first side.

11. The method of claim 8 wherein said step of forming a first barge comprises rigidly-connecting said first portion to said lever-arm barge.

12. The method of claim 8 wherein said step of forming a first barge comprises unitizing said first portion with said lever-arm barge.

13. The method of claim 8 wherein said step of pivotally-coupling said first portion to a second barge comprises hingedly-coupling said first portion to said second barge.

14. The method of claim 9 wherein said step of pivotally-coupling at least one intermediate barge between said first and second barge comprises hingedly-coupling said at least one intermediate barge between said first portion and said second barge.

* * * * *